(12) United States Patent
Rothman et al.

(10) Patent No.: US 8,024,477 B2
(45) Date of Patent: Sep. 20, 2011

(54) SYSTEM AND METHOD TO ESTABLISH A PEER-TO-PEER IT BACKBONE

(75) Inventors: Michael A. Rothman, Puyallup, WA (US); Vincent J. Zimmer, Federal Way, WA (US); Robert C. Swanson, Olympia, WA (US); Matthew E. Tolentino, Columbia, SC (US)

(73) Assignee: Intel Corporation, Santa Clara, CA (US)

( * ) Notice: Subject to any disclaimer, the term of this patent is extended or adjusted under 35 U.S.C. 154(b) by 1552 days.

(21) Appl. No.: 11/173,469

(22) Filed: Jun. 30, 2005

(65) Prior Publication Data

US 2007/0005744 A1    Jan. 4, 2007

(51) Int. Cl.
*G06F 15/173* (2006.01)

(52) U.S. Cl. ........ 709/238; 709/223; 709/243; 709/251; 717/168; 717/172; 717/177

(58) Field of Classification Search .................. 709/223, 709/238
See application file for complete search history.

(56) References Cited

U.S. PATENT DOCUMENTS

| | | | |
|---|---|---|---|
| 7,162,538 B1* | 1/2007 | Cordova | 709/238 |
| 2003/0115413 A1* | 6/2003 | Wood et al. | 711/114 |
| 2003/0212571 A1* | 11/2003 | Sazawa et al. | 705/1 |
| 2004/0249972 A1* | 12/2004 | White et al. | 709/243 |
| 2005/0216559 A1* | 9/2005 | Manion et al. | 709/205 |
| 2006/0114903 A1* | 6/2006 | Duffy et al. | 370/390 |
| 2006/0126611 A1* | 6/2006 | Kelly et al. | 370/389 |

OTHER PUBLICATIONS

Musich, P. Cyclades Extends Out-of-Band Management to Remote Offices [online], May 2005 [retrieved on Jan. 18, 2010]. Retrieved from the Internet:<URL: http://www.eweek.com/c/a/IT-Management/Cyclades-Extends-OutofBand-Management-to-Remote-Offices/>.*

* cited by examiner

*Primary Examiner* — Tonia L. M. Dollinger
*Assistant Examiner* — Adam Cooney
(74) *Attorney, Agent, or Firm* — Trop, Pruner & Hu, P.C.

(57) ABSTRACT

A peer-to-peer IT (Information Technology) backbone. The system includes at least one IT server and a plurality of client computers arranged in a peer-to-peer IT backbone. Each of the client computers includes an in-band processor, an out-of-band (OOB) microcontroller, and a storage device coupled to the in-band processor and OOB microcontroller. The storage device includes a reserved area for the OOB microcontroller to enable an IT-administration to push IT payloads from the at least one IT server onto the reserved area of at least one of the plurality of client computers. The IT payloads are disseminated throughout the peer-to-peer IT backbone by the OOB microcontroller of the client computers.

26 Claims, 8 Drawing Sheets

SYSTEM AND METHOD TO ESTABLISH A PEER-TO-PEER IT BACKBONE

BACKGROUND OF THE INVENTION

1. Field of the Invention

The present invention is generally related to the field of networks. More particularly, the present invention is related to a system and method for establishing a peer-to-peer IT (Information Technology) backbone.

2. Description

In large data centers and/or corporate environments, an IT (Information Technology) server may manage a thousand or more client computers on their network. When an IT server pushes configuration changes to the client computers in its network, the IT server must maintain a point-to-point connection to each client computer to transfer the data. This not only causes a lot of traffic on the network, but also consumes a large amount of the IT server's time. The IT server then becomes the single point of failure. If the IT server goes down, then all of the client computers on the network have essentially lost their external resources.

Often times, there is a need for the IT server to disseminate updates as quickly as possible. For example, when a virus attack is taking place, large data centers or corporate environments need to quickly disseminate a patch to their corresponding workstations to prevent the virus from infecting their network. Having the IT server disseminate these updates using one-to-one links with each client computer that it services is very time consuming and places a heavy burden on the IT server's ability to manage efficiently.

Thus, what is needed is a system and method that lessens the burden of IT administration yet leverages the existing network infrastructure to allow for scalable and fault-tolerant configurations of network systems. What is also needed is a method for enabling an operating system (OS) or a platform-related update to be disseminated to workstations in the network in an efficient manner. What is further needed is a method for distributing configuration tasks so that a peer node, and even possibly an IT server, may fail without impeding the provisioning/management of the network that the IT server manages.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a peer-to-peer network for constructing an IT managed backbone infrastructure. Embodiments of the present invention distribute resources using seamless, portable IT managed drives, such as, for example, mounted network drive equivalents (also referred to throughout this specification as P: drive equivalents), that operate on-line and off-line. Embodiments of the present invention also provide fault resilient quick provisioning of platforms and faster access to IT managed resources. This is accomplished using an out-of-band (OOB) microcontroller having OOB network connections incorporated on each of the client computers in the peer-to-peer network. Each out-of-band network connection provides a means of disseminating IT payloads in a peer-to-peer manner. By enabling an IT server to push data to an initial set of target client computers, the target client computers may, in turn, communicate with their peers to push the data to their peers, and those peers can push the data to other peers, and so on.

Figure 1:
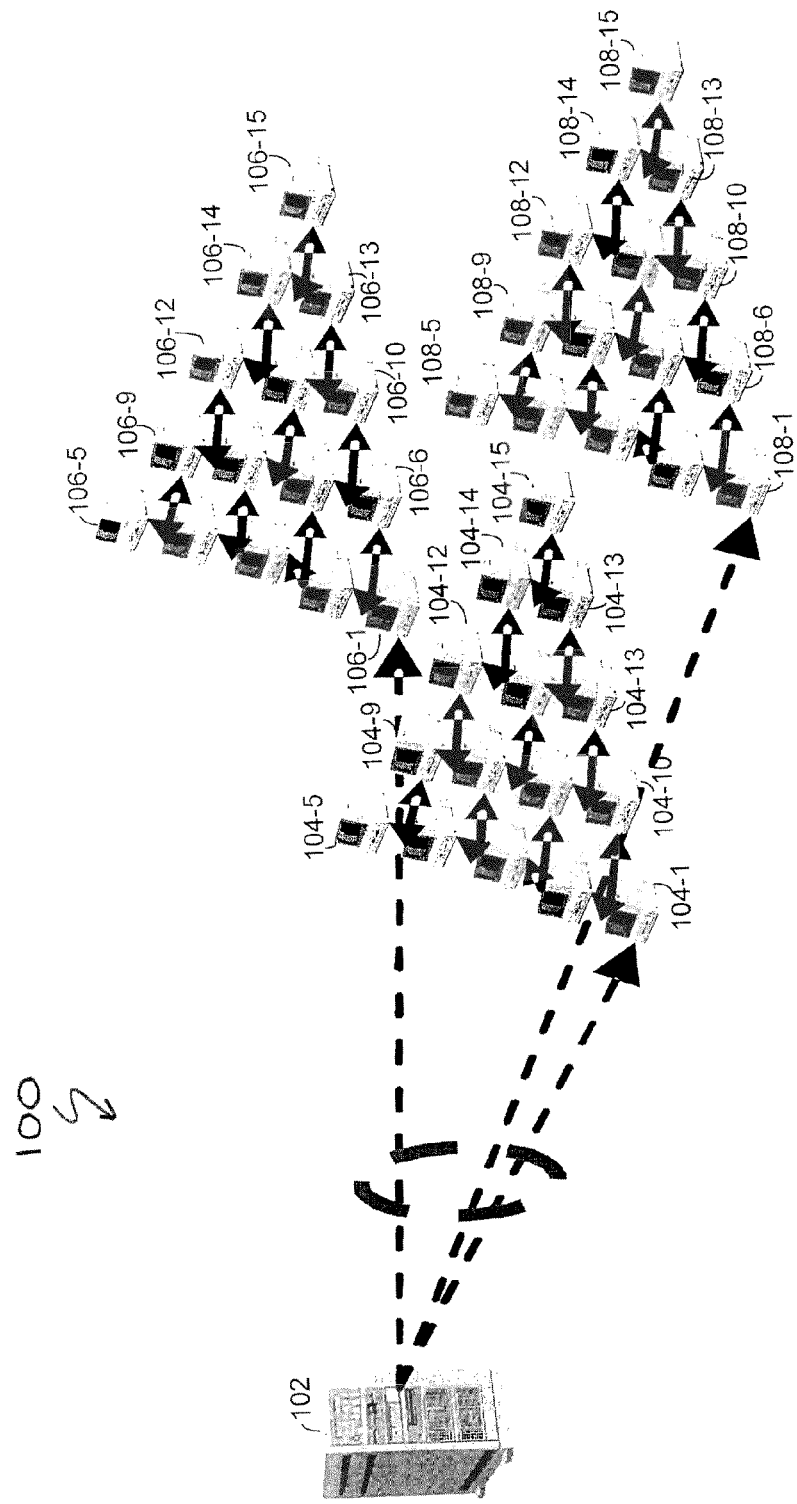
FIG. 1 is a block diagram illustrating an exemplary peer-to-peer IT backbone according to an embodiment of the present invention.

FIG. 1 is a block diagram illustrating an exemplary peer-to-peer IT backbone 100 according to an embodiment of the present invention. Peer-to-peer IT backbone 100 comprises an IT server 102 and a plurality of client computers 104-1 . . . 104-15, 106-1 . . . 106-15, and 108-1 . . . 108-15. IT server 102 manages client computers 104, 106, and 108. Client computers 104, 106, and 108 are each connected in a peer-to-peer arrangement.

Unlike conventional one-to-one communication links between the IT server and each client computer in the network, the communication links between IT server 102 and client computers 104, 106, and 108 has been greatly reduced. As previously indicated, an initial set of client computers may be contacted by IT server 102. As shown in FIG. 1, the initial set of client computers may include 104-1, 106-1, and 108-1.

In other embodiments, IT server 102 may directly link to other client computers 104-5, 106-5, and 108-5. In yet other embodiments, other client computers may be targeted as the initial set of client computers in which IT server 102 communicates. In embodiments, the number of client computers that are directly linked to IT server 102 may also vary as well. Once client computers 104-1, 106-1, and 108-1 have the data that was transmitted from IT server 102, client computers 104-1, 106-1, and 108-1 may communicate the data to their peers by pushing the data to their peers. The pushing of the data from one client computer to the next continues until the data has been pushed all the way to client computers 104-15, 106-15, and 108-15. The peer-to-peer configuration of client computers 104-1 to 104-15, 106-1 to 106-15, and 108-1 to 108-15 leverages the resources of the platform and network to disseminate the data. The peer-to-peer configuration also provides the ability to distribute disk images and configuration settings throughout the network.

Embodiments of the present invention use client computers that contain platforms having an in-band processor and an out-of-band microcontroller. Embodiments of the present invention leverage the capabilities of the out-of-band microcontroller to enable peer-to-peer IT backbone 100 to operate in an efficient and seamless manner, independent of the operating system. Since the out-of-band microcontroller has no dependencies on the operating system, an in-band processor may be in operation or running on standby while the out-of-band microcontroller may operate intelligently based on incoming queries/commands and communicate across the network to other entities, such as, but not limited to, other client computers 104, 106, or 108, or IT server 102 on peer-to-peer IT backbone 100.

Figure 2:
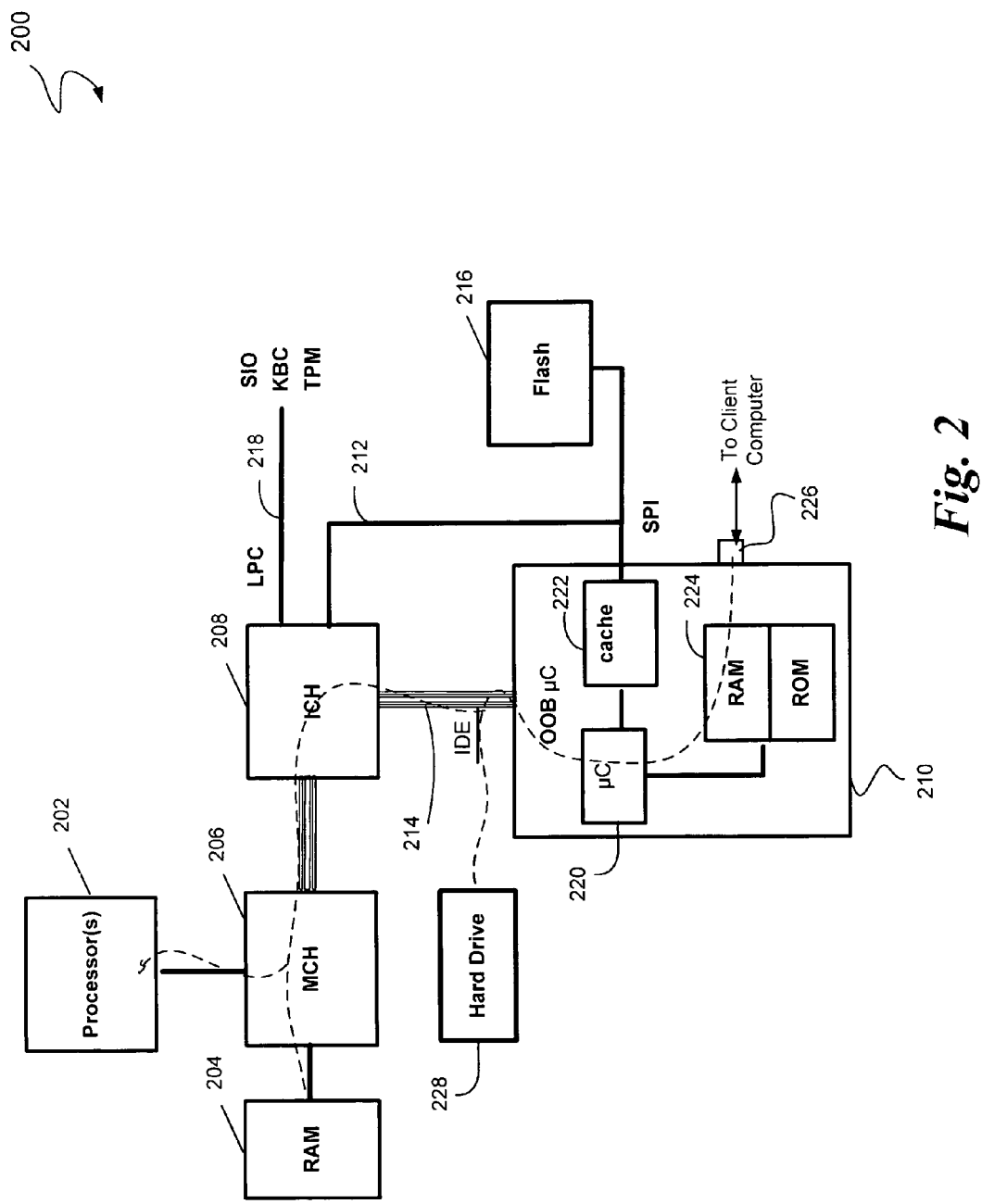
FIG. 2 is a block diagram illustrating an exemplary client computer system having an out-of-band microcontroller for implementing an embodiment of the present invention.

FIG. 2 is a block diagram illustrating an exemplary client computer system 200 having an out-of-band microcontroller for implementing an embodiment of the present invention. Computer system 200 comprises a processor 202, which may be referred to as an in-band processor. Processor 202 may connect to a system memory 204 via a memory controller hub (MCH) 206. Processor 202 may be any type of processor capable of executing software, such as, for example, a microprocessor, digital signal processor, microcontroller, or the like. Although FIG. 2 shows a single processor 202, in embodiments, there may be one or more in-band processors included in computer system 200. The one or more in-band processors may include multiple threads, multiple cores, or the like.

Processor 202 may be connected to I/O (Input/Output) devices via an input/output controller hub (ICH) 208. ICH 208 may be coupled to various I/O devices, such as, for example, a super I/O controller (SIO), a keyboard controller (KBC), or a trusted platform module (TPM) via a low pin count (LPC) bus 218. The SIO may have access to floppy drives or industry standard architecture (ISA) devices. In an embodiment, ICH 208 may be coupled to a non-volatile memory 216 via serial peripheral interface (SPI) bus 212. Although shown in FIG. 2 as a flash memory, non-volatile memory 216 may be, but is not limited to, flash memory, static random access memory (SRAM), or the like.

An out-of-band (OOB) microcontroller 210 may be coupled to ICH 208 via a peripheral component interconnect (PCI) or PCI express bus 214. OOB microcontroller 210 may also be coupled to non-volatile memory 216 via SPI bus 212. OOB microcontroller 210 comprises a processor 220 which may be operatively coupled to a cache memory 222 as well as RAM and ROM memory 224. OOB microcontroller 210 may have an independent connection to a power supply (not shown) to enable out-of-band communications even when in-band processor 202 is not active. OOB microcontroller 210 may have a built-in network interface 226 to enable out-of-band communications with other devices, such as, but not limited to, IT server 102 and other client computers 104, 106, and 108 in peer-to-peer IT backbone 100. OOB microcontroller 210 may also be coupled to an IDE (Intelligent Drive Electronics) hard disk 228 via PCI bus 214. Hard disk 228 includes a controller (not shown) integrated into the disk. Hard disk 228 may provide a reserved area that may be controlled by IT via OOB microcontroller 210 to enable peer-to-peer IT backbone 100 to communicate IT payloads in a peer-to-peer manner.

As indicated above, embodiments of the present invention include a reserved area of hard disk 228 for use as part of peer-to-peer IT backbone 100. The reserved area of hard disk 228 is separate from, and not useable by, the area of hard disk 228 specified for the operating system (O/S). The reserved area of hard disk 228 is controlled by IT via OOB microcontroller 210, and provides a means of disseminating data during pre-boot, via an EFI (Extensible Firmware Interface) agent, or a runtime agent. In an embodiment, the IT department may enable a user of a client computer to view a portion of the reserved area. In one embodiment, the portion of the viewable reserved area may be indicated by a drive letter, such as, for example, a P: drive equivalent. This enables the user to store data on the drive as well as IT. In one embodiment, the reserved area may also be used as a mailbox. The reserved area of hard disk 228 provides the equivalent of both an on-line and off-line IT P: drive and is used as non-volatile storage.

Figure 3:
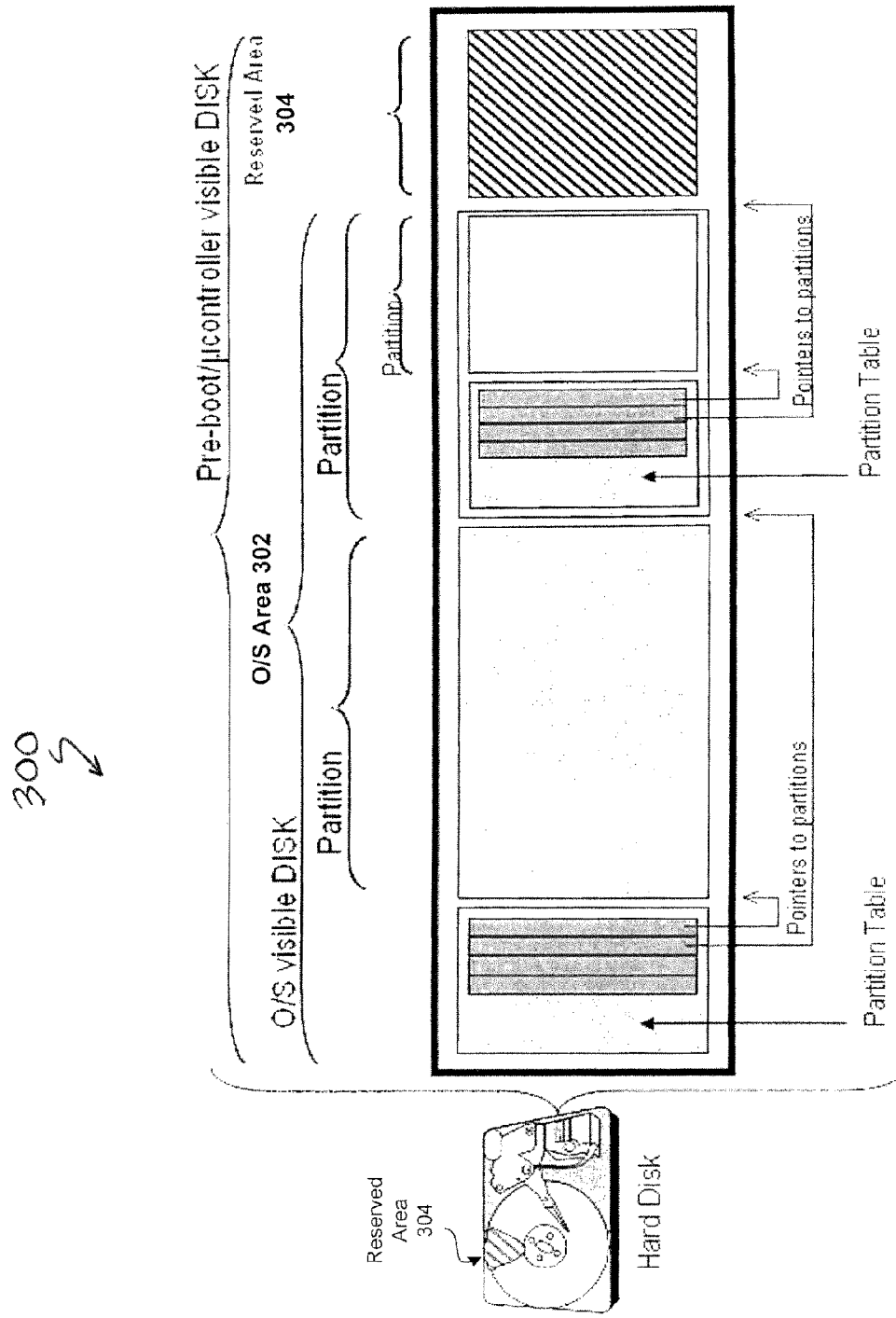
FIG. 3 is an exemplary diagram of a hard disk configuration for an in-band processor and an out-of-band microcontroller of a client computer according to an embodiment of the present invention.

FIG. 3 is an exemplary diagram of a hard disk configuration 300 for an in-band processor and an out-of-band microcontroller according to an embodiment of the present invention. Data contained on hard disk 228 may be used during pre-boot. Hard disk configuration 300 comprises an operating system (O/S) disk portion 302 and a reserved area disk portion 304. Operating system disk portion 302 is used solely by in-band processor 202. Reserved area disk portion 304 is used solely by OOB microcontroller 210. Having the reserved area disk portion 304 separate from O/S disk portion 302 eliminates the need to interact with the O/S to make peer-to-peer IT backbone 100 work. In other words, the O/S is not involved in the operation of peer-to-peer IT backbone 100.

In an embodiment, the amount of reserved area of hard disk 228 may be dictated based on IT policy. In another embodiment, the amount of reserved area on hard disk 228 may vary. The uniqueness of the reserved area on hard disk 228 lies in the ability to access the reserved area even when the client computer is offline. Thus, while a client computer is sleep or offline, IT server 102 or another client computer 104, 106, or 108 in peer-to-peer IT backbone 100 may push IT payloads to the client computer to be launched and disseminated by an IT driver, resident on the client computer, via out-of-band microcontroller 210 when the client computer wakes up or is back online. Thus, an IT server going down or a client computer's connection to the IT server going down does not prevent any data pushed into the reserved area of the hard disk from being disseminated across the network because the hard disk is local to the client computer.

In the course of a day, client computers may go on-line and/or go off-line. Peer-to-peer IT backbone 100 is capable of handling the dynamic nature of these client computers by employing techniques such as Distributed Hash Tables (DHTs) and Byzantine Fault Tolerance (BFT). DHTs are used to enable the efficient use of shared distributed data. Distributed hash tables are well known in the relevant art(s). BFT is used to achieve protection against peer unavailability. BFT is well known in the relevant art(s) as well. Whenever a client computer system detects a state transition (i.e., shutting a client computer down, a client computer going into hibernation, turning a client computer on, or waking a client computer up), the peer-to-peer IT backbone must compensate for the state transition to make sure that all client computers on the live network are serviced accordingly.

Figure 4A:
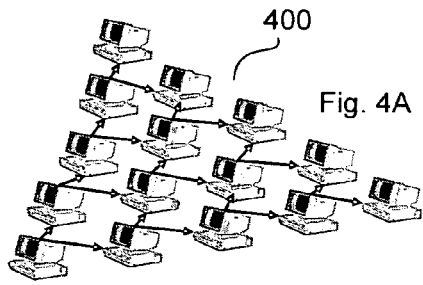
FIGS. 4A, 4B, 4C, 4D, and 4E are exemplary diagrams illustrating the dynamic nature of a peer-to-peer IT backbone according to an embodiment of the present invention.
Figure 4B:
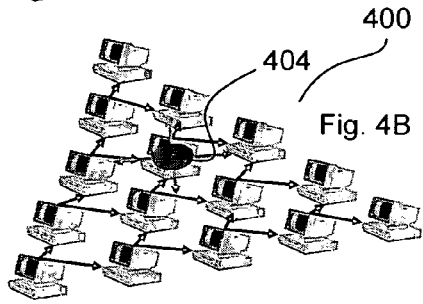

FIGS. 4A, 4B, 4C, 4D, and 4E are exemplary diagrams illustrating the dynamic nature of a peer-to-peer IT backbone according to an embodiment of the present invention. FIG. 4A illustrates a peer-to-peer IT backbone 400 in which all client computers are up and running. FIG. 4B illustrates peer-to-peer IT backbone 400 in which a client computer 404 has made a request to go to sleep. In this instance, client computer 404 must determine whether an IT payload has been pushed into the reserved area of its hard disk that needs to be disseminated or if there is other data in the reserved area of the hard disk that needs to be disseminated. If an IT payload or other data is to be disseminated, client computer 404 must export the data before the power-state transition has fully taken place.

Figure 5A:
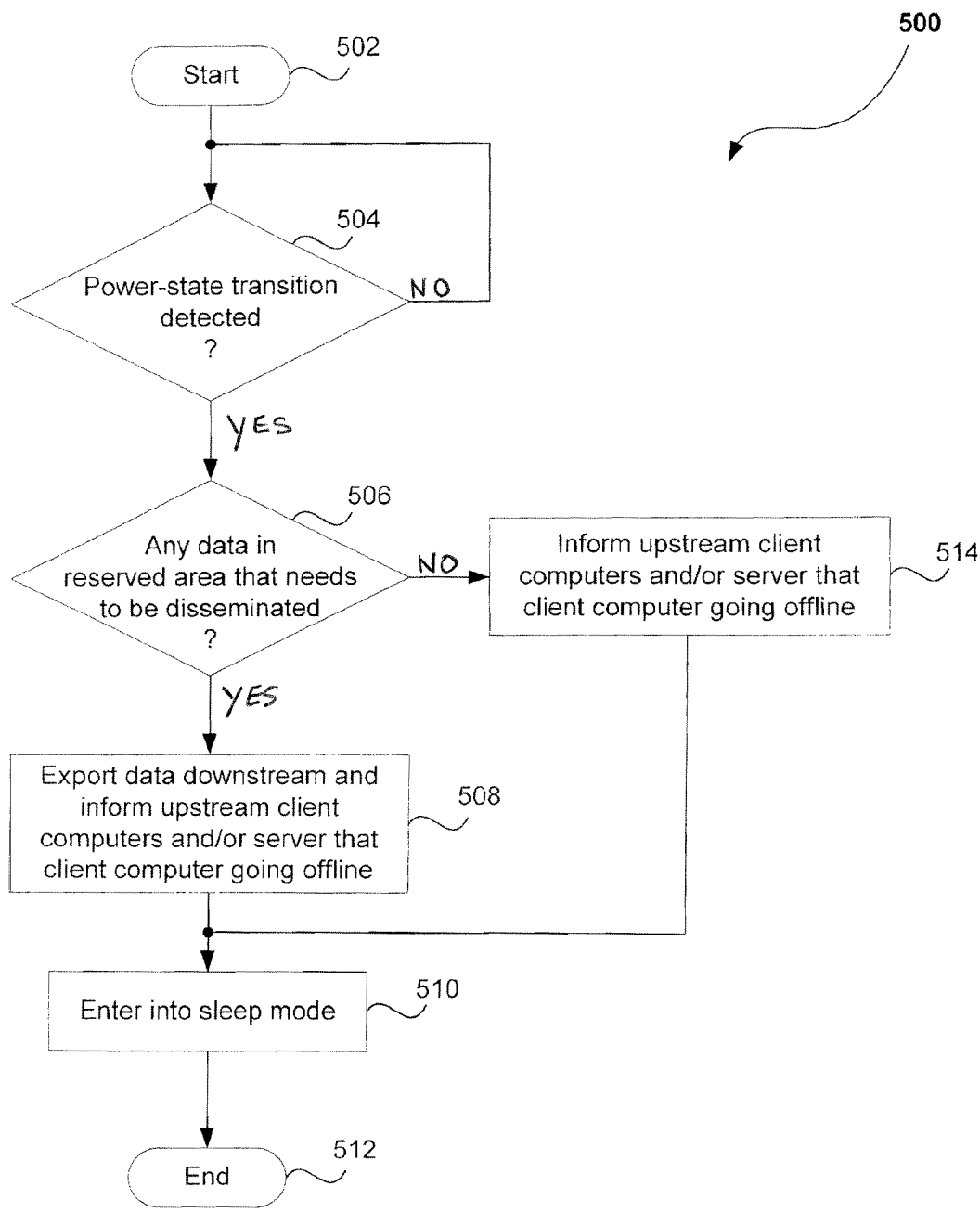
FIG. 5A is a flow diagram describing an exemplary method for a client computer exiting a dynamic peer-to-peer IT backbone according to an embodiment of the present invention.

FIG. 5A is a flow diagram 500 describing an exemplary method for a client computer exiting (i.e., sleep) a dynamic peer-to-peer IT backbone according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to decision block 504.

In decision block 504, it is determined whether a power-state transition request for going to sleeping, hibernating, or going offline has been detected. If a power-state transition for sleeping, hibernating, or going offline has not been detected, then remain at block 504. If a power-state transition for sleeping, hibernating, or going offline has been detected, the process proceeds to decision block 506.

In decision block 506, it is determined whether any data has been placed in the reserved area of the hard disk for disseminating to peers that has not been disseminated. If data has been placed in the reserved area of the hard disk that has not been disseminated, the process proceeds to block 508.

In block 508, the data is exported. In one embodiment, the client computer, such as client computer 404, may temporarily postpone going to sleep until the data has been exported. In another embodiment, the client computer may export the data during the power-state transition. By exporting the data, the client computer pushes the data downstream to the peers in which the client computer is required to disseminate the data, based on a distributed hash table technique. The client computer must also talk to the client computers that are upstream of the client computer or the server, if necessary, to let them know that the client computer is about to go to sleep, and that they must now be responsible for the other client computers downstream of the client computer. The process then proceeds to block 510.

In block 510, the client computer may go to sleep. The process then proceeds to block 512, where the process ends.

Returning to decision block 506, if it is determined that there is no data in the reserved area that needs to be disseminated, the process then proceeds to block 514. In block 514, the client computer must talk to the remaining upstream client computers to inform them that the client computer is about to go to sleep and that they must now be responsible for the other client computers downstream of the client computer. The process then proceeds to block 510, where the client computer may go to sleep.

Returning to decision block 504, if it is determined that a state transition request for going to sleep or hibernating has not been detected, then the process proceeds to block 512, where the process ends.

Figure 4C:
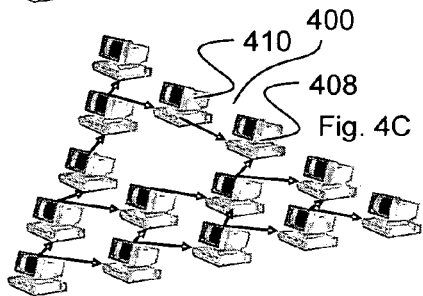

FIG. 4C illustrates peer-to-peer IT backbone 400 after client computer 404 has gone to sleep. When client computer 404 goes to sleep, BFT is used to protect the client computers in which client computer 404 was linked to make sure that they continue to receive data as a fault tolerance measure. As shown in FIG. 4C, client computer 408 is now receiving data from client computer 410 instead of client computer 404. Thus, links between all of the client computers have been adjusted accordingly, using distribution hash tables, to ensure that all client computers may receive data.

Figure 4D:
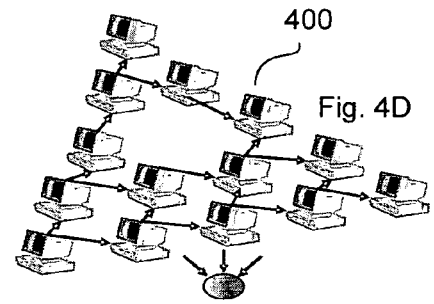

FIG. 4D illustrates peer-to-peer IT backbone 400 in which a client computer is waking up. When a client computer wakes up, the client computer must be re-instated into the network. A re-integration handshake is used to accomplish re-instatement. During the re-integration handshake, the client computer must broadcast to its peers that it has awaken so that the client computer can be re-instated into the network. In turn, the client computer may receive any data that it has missed since going to sleep or being off-line.

Figure 5B:
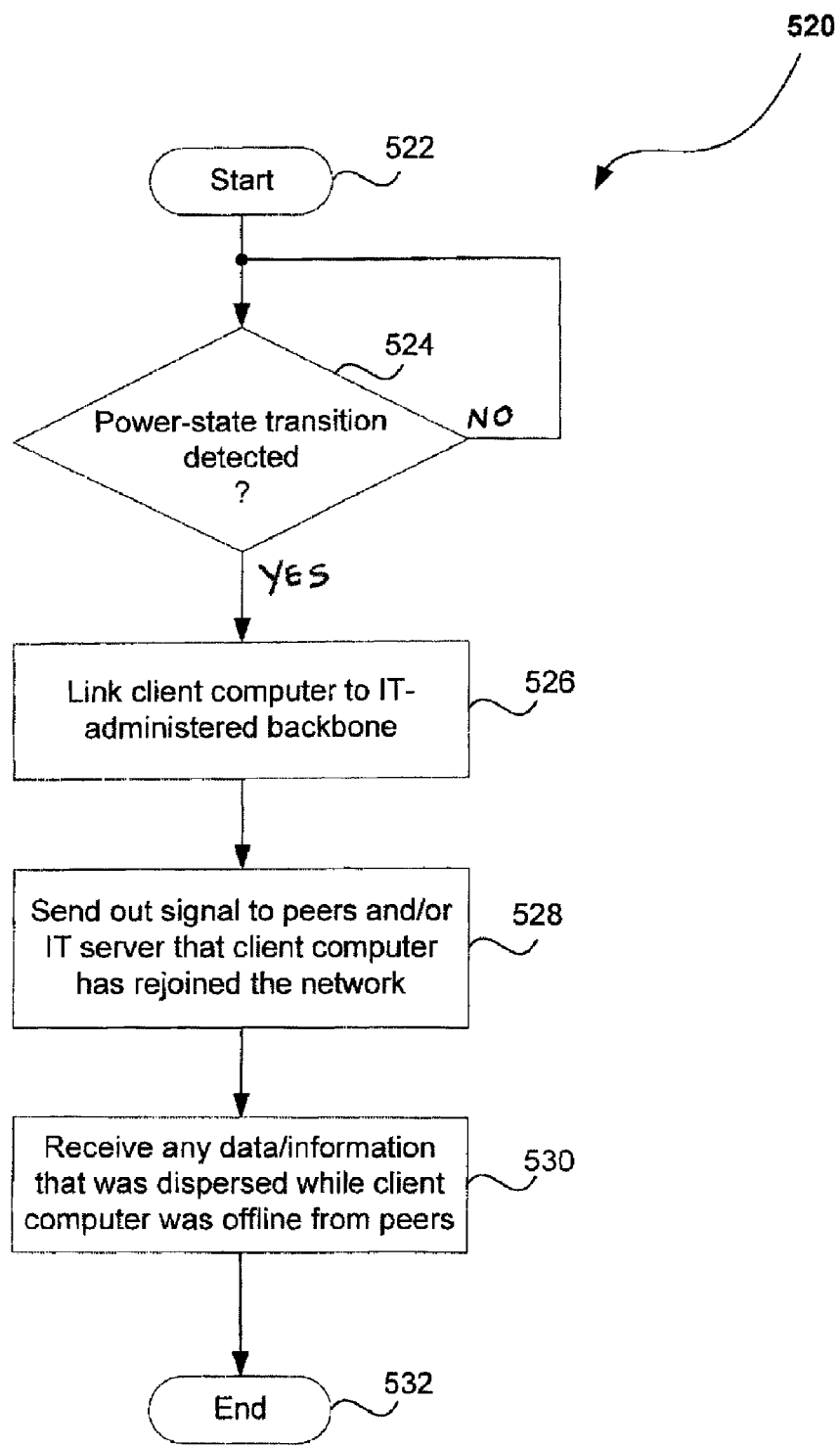
FIG. 5B is a flow diagram describing an exemplary method for a client computer being re-integrated into a dynamic peer-to-peer IT backbone according to an embodiment of the present invention.

FIG. 5B is a flow diagram 520 describing an exemplary method for a client computer being re-integrated into a dynamic peer-to-peer IT backbone according to an embodiment of the present invention. The invention is not limited to the embodiment described herein with respect to flow diagram 520. Rather, it will be apparent to persons skilled in the relevant art(s) after reading the teachings provided herein that other functional flow diagrams are within the scope of the invention. The process begins with block 522, where the process immediately proceeds to decision block 524.

In decision block 524, it is determined whether a state transition indicating that a client computer is waking up or coming on-line has been detected. If a state transition indicating that a client computer is waking up or coming on-line has not been detected, then remain at block 524. If a state transition indicating that a client computer is waking up or coming on-line has been detected, then the process proceeds to block 526.

In block 526, the client computer is linked up to the network based on DHT techniques. In block 528, after the client computer has been linked back to the network, the client computer may send out a signal to its surrounding peers, and the IT server if necessary, that the client computer has rejoined the network. The process then proceeds to block 530.

In block 530, any data/information that was dispersed throughout peer-to-peer IT backbone 100 while the client computer was off-line is imported into the client computer. The process then proceeds to block 532, where the process ends.

Figure 4E:
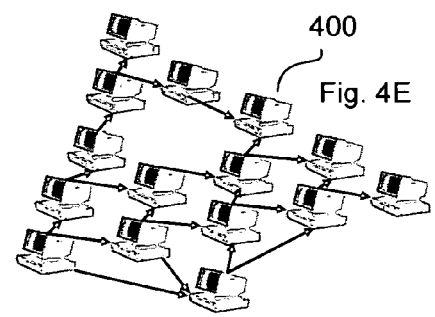

FIG. 4E illustrates peer-to-peer IT backbone 400 after the client computer has been added to the network. Again, when a client computer is added, DHTs and BFT are used to determine how to best distribute the data for efficiency and fault tolerance.

Figure 6A:
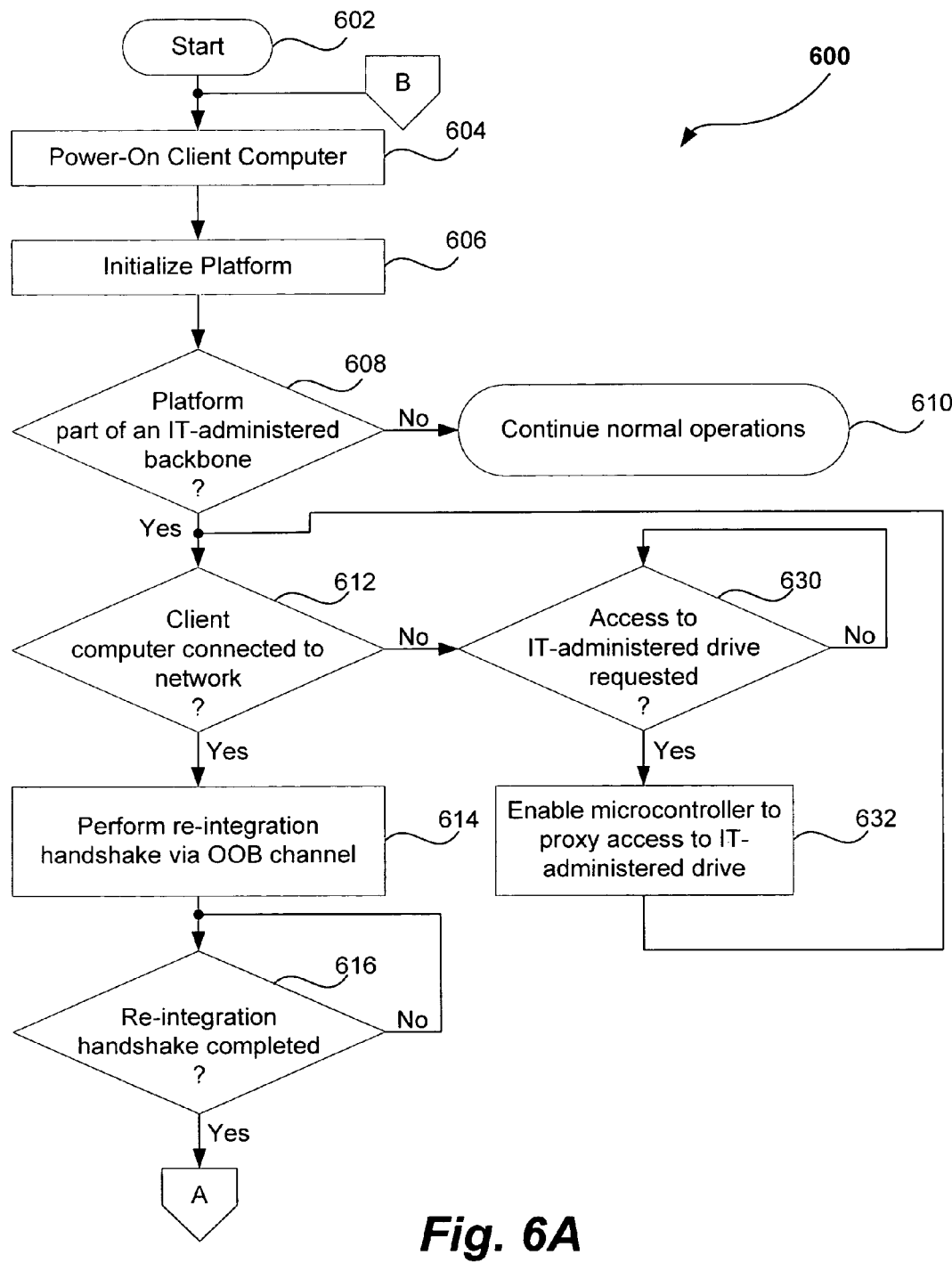
FIGS. 6A and 6B are a flow diagram describing an exemplary method of operation for a client computer on a dynamic peer-to-peer IT backbone according to an embodiment of the present invention.
Figure 6B:
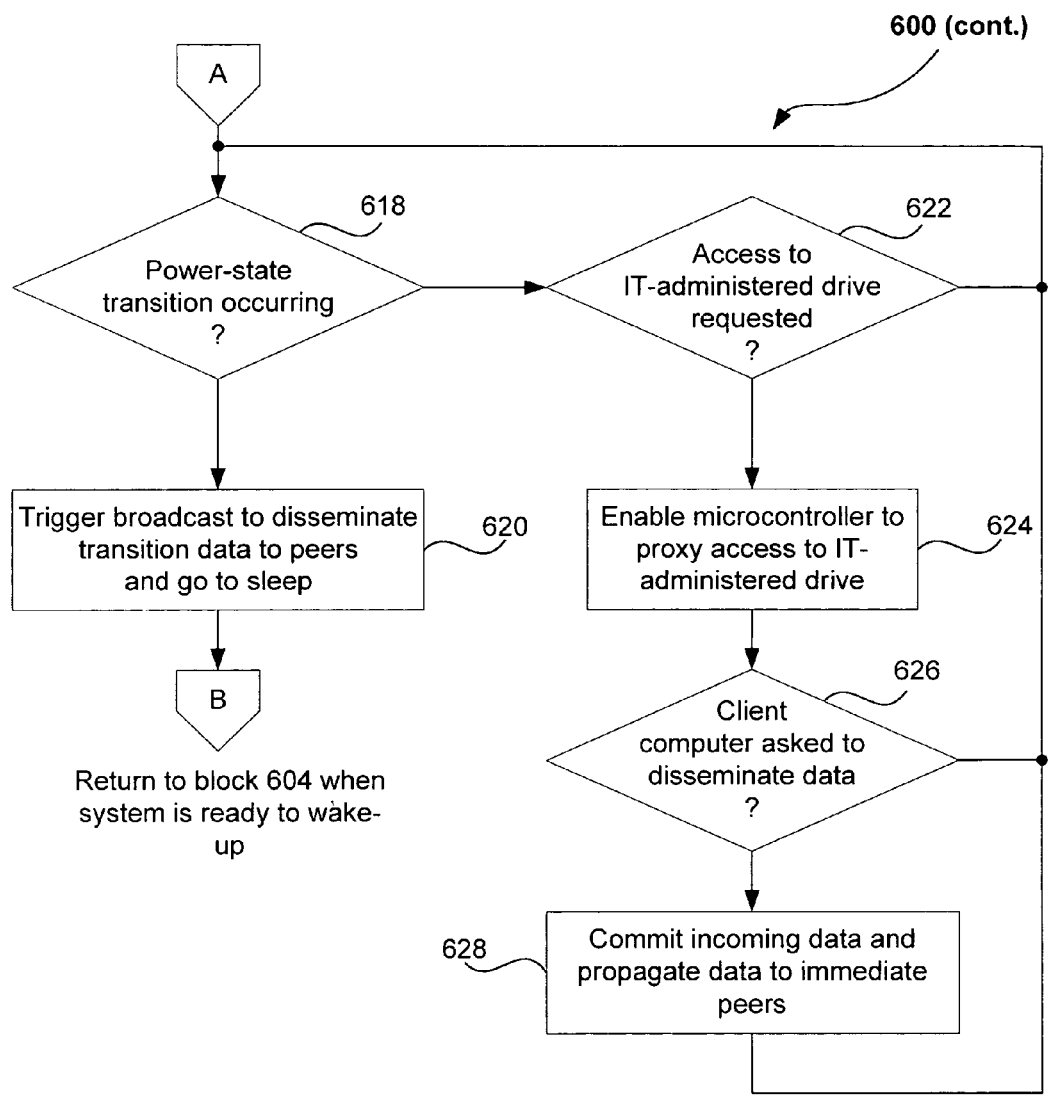

FIGS. 6A and 6B are a flow diagram 600 describing an exemplary method of operation for a client computer on a dynamic peer-to-peer IT backbone according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. The process begins with FIG. 6A, block 602, where the process immediately proceeds to decision block 604.

In block 604, a client computer is powered on. In block 606, platform initialization is performed on the client computer. During platform initialization, all subsystems of the platform, such as, but not limited to, memory, storage devices, other peripheral devices, etc., are initialized. The operating system for the in-band processor is also booted during platform initialization. The process then proceeds to decision block 608.

In decision block 608, it is determined whether the platform is part of an IT-administered backbone. In other words, is the client computer part of a peer-to-peer IT backbone as described in FIGS. 1, 2, and 3? If it is determined that the platform is not part of an IT-administered backbone, the process proceeds to block 610.

In block 610, normal operations for the client computer will proceed.

Returning to decision block 608, if it is determined that the platform is part of an IT-administered backbone, then the process proceeds to decision block 612. In decision block 612, it is determined whether the client computer is connected to the peer-to-peer IT backbone. If the client computer is connected to the peer-to-peer IT backbone, the process proceeds to block 614.

In block 614, a re-integration handshake is performed between the client computer and the peer-to-peer IT backbone. The re-integration handshake is initiated when the client computer sends a broadcast through the platform OOB microcontroller to its peers announcing that it is re-joining the network. In return, the peers will send data back to the client computer to share their contents with the client computer. The client computer may also share its contents with its peers. The process then proceeds to decision block 616.

In decision block 616, it is determined whether the re-integration process is finished. If the re-integration process is not finished, the process remains at decision block 616. If the re-integration process is finished, the process then proceeds to FIG. 6B, decision block 618.

In decision block 618, it is determined whether the client computer is going through a power-state transition. In other words, is the client computer going to sleep, going into hibernation, or leaving the network? If a power-state transition is occurring, the process proceeds to block 620.

In block 620, the client computer triggers a broadcast to disseminate any transition data to its peers on the network as described with reference to FIG. 5A and then goes into a sleep state. When the client computer is ready to power back on, the process then proceeds back to FIG. 6A, block 604.

Returning to FIG. 6B, decision block 618, if it is determined that the client computer is not going through a power-state transition, the process proceeds to decision block 622.

In decision block 622, it is determined whether access to the IT-administered drive (i.e., reserved area) is being requested. If access to the IT-administered drive is being requested, the process proceeds to block 624. In block 624, the OOB microcontroller may proxy accesses to the reserved area of the hard disk. This reserved area gives a user the seamless illusion of a new drive, such as, for example, a P: drive equivalent. The process then proceeds to decision block 626.

In decision block 626, it is determined whether the client computer is being asked to disseminate data placed in the IT administered drive (i.e., P: drive equivalent). If the client computer is being asked to disseminate data, then the process proceeds to block 628.

In block 628, any incoming data is committed, if OOB data was sent, and the data is disseminated to the client computer's immediate peers. The immediate peers will, in-turn, facilitate the proliferation of the data as well. In other words, the data will be sent to the peers of the immediate peers, etc., etc., until all the peers on the network have received the data. The process then proceeds back to decision block 618 to determine whether a power-state transition has occurred.

Returning to decision block 626, if it is determined that the client computer is not being asked to disseminate data, the process proceeds back to decision block 618 to determine whether a power-state transition has occurred.

Returning to decision block 622, if it is determined that access to the IT-administered drive is not being requested, the process proceeds back to decision block 618 to determine whether a power-state transition has occurred.

Returning to FIG. 6A, decision block 612, if the client computer is not connected to the peer-to-peer IT backbone, then the client computer is operating off-line, and the process proceeds to decision block 630.

In decision block 630, it is determined whether access to the IT-administered drive is being requested. If access to the IT-administered drive is not being requested, the process remains at decision block 630. If access to the IT-administered drive is being requested, the process proceeds to block 632.

In block 632, the OOB microcontroller may proxy accesses to the reserved area of the hard disk, providing the seamless illusion of an equivalent P: drive access, even though the client computer is operating off-line. Thus, even though it appears to the user that the equivalent P: drive is remote, the equivalent P: drive is actually local, thereby enabling the user of the client computer access to the drive while offline. The process then proceeds back to decision block 612, where it is determined whether the client computer has connected to the peer-to-peer IT backbone. In other words, it determines whether the client computer has gone on-line.

Embodiments of the present invention may be implemented using hardware, software, or a combination thereof and may be implemented in one or more computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. An Information Technology (IT)-administered backbone, comprising:
   at least one IT server;
   a plurality of client computers arranged in a peer-to-peer IT backbone, each of the client computers having an in-band processor, an out-of-band (OOB) microcontroller, and a storage device coupled to the in-band processor and OOB microcontroller, the storage device having a reserved area for the OOB microcontroller to enable an IT-administration to push IT payloads from the at least one IT server onto the reserved area of at least one of the plurality of client computers, wherein the IT payloads are disseminated throughout the peer-to-peer IT backbone by the client computers.

2. The IT-administered backbone of claim 1, wherein the reserved area of the storage device acts as a P: drive equivalent.

3. The IT-administered backbone of claim 1, wherein the reserved area of the storage device of the at least one client computer is accessible to the at least one client computer when the at least one client computer is offline.

4. The IT-administered backbone of claim 1, wherein when a client computer goes offline, a fault tolerance technique is employed to achieve protection against peer unavailability.

5. The IT-administered backbone of claim 4, wherein the fault tolerance technique is a Byzantine fault tolerance technique.

6. The IT-administered backbone of claim 1, wherein the dissemination of the IT payload by the client computers further comprises the dissemination of the IT payload by the client computers using a distributed hash table technique to enable the efficient distribution of the IT payloads from one peer to another peer throughout the peer-to-peer IT backbone.

7. A method for IT-administration of a client computer in an IT administered backbone, comprising:
   receiving, from an IT server, an IT payload, wherein the IT payload is placed in a reserved area of a storage device, the reserved area of the storage device dedicated for use by an out-of-band microcontroller;
   enabling an IT driver to access the reserved area to determine if the IT payload is to be disseminated in a peer-to-peer IT backbone; and
   if the IT payload is to be disseminated, disseminating the IT payload to immediate peers to enable the immediate peers to facilitate the proliferation of the IT payload throughout the peer-to-peer IT backbone.

8. The method of claim 7, wherein the determination of who is an immediate peer is based on a distributed hash table technique.

9. The method of claim 7, wherein when a power-state transition indicating a sleep mode is detected, the method further comprising triggering a broadcast to disseminate transition data to immediate peers.

10. The method of claim 9, wherein triggering the broadcast to disseminate transition data to immediate peers comprises:
    exporting data to downstream immediate peers, if data is available for dissemination; and
    informing upstream immediate peers of a sleep mode transition, wherein the upstream immediate peers will assume responsibility for the downstream immediate peers once the sleep mode is entered.

11. The method of claim 10, wherein when the sleep mode is entered, Byzantine fault tolerance and distributed hash table techniques are used to protect the unavailable peers and to ensure that all peers are capable of receiving data from a peer in the peer-to-peer IT backbone.

12. The method of claim 7, wherein when a power-state transition indicating a wake-up mode is detected, the method further comprising:
    determining whether the client computer is on-line; and
    if the client computer is on-line, performing a re-integration handshake with the peer-to-peer IT backbone.

13. The method of claim 12, wherein performing a re-integration handshake comprises:
    connecting to the peer-to-peer IT backbone;
    sending a broadcast through the OOB microcontroller to the immediate peers announcing the re-joining of the network; and
    receiving, from the immediate peers, any data/information that was disseminated while the client computer was offline.

14. The method of claim 13, further comprising sharing any data with peers of the client computer, if necessary.

15. The method of claim 12, wherein if the client computer is not on-line, the method further comprising:
    determining whether access to the reserved area of the storage device is being requested; and
    if access is being requested, enabling the OOB microcontroller to proxy access to the reserved area, wherein the reserved area is treated as a P: drive equivalent.

16. The method of claim 15, wherein the P: drive equivalent is accessed while offline.

17. An article comprising:
a non-transitory storage medium having a plurality of machine accessible instructions, wherein when the instructions are executed by a processor, the instructions provide for receiving, from an IT server, an IT payload, wherein the IT payload is placed in a reserved area of a storage device, the reserved area of the storage device dedicated for use by an out-of-band microcontroller;
enabling an IT driver to access the reserved area to determine if the IT payload is to be disseminated in a peer-to-peer IT backbone; and
if the IT payload is to be disseminated, disseminating the IT payload to immediate peers to enable the immediate peers to facilitate the proliferation of the IT payload throughout the peer-to-peer IT backbone.

18. The article of claim 17, wherein the determination of who is an immediate peer is based on a distributed hash table technique.

19. The article of claim 17, wherein when a power-state transition indicating a sleep mode is detected, the article further comprising instructions for triggering a broadcast to disseminate transition data to immediate peers.

20. The article of claim 19, wherein instructions for triggering the broadcast to disseminate transition data to immediate peers comprises instructions for:
exporting data to downstream immediate peers, if data is available for dissemination; and
informing upstream immediate peers that the sleep mode is about to be entered, wherein the upstream immediate peers will assume responsibility for the downstream immediate peers once the sleep mode is entered.

21. The article of claim 20, wherein when the sleep mode is entered, Byzantine fault tolerance and distributed hash table techniques are used to protect the unavailable peers and to ensure that all peers are capable of receiving data from a peer in the peer-to-peer IT backbone.

22. The article of claim 17, wherein when a power-state transition indicating a wake-up mode is detected, the article further comprising instructions for:
determining whether the client computer is on-line; and
if the client computer is on-line, performing a re-integration handshake with the peer-to-peer IT backbone.

23. The article of claim 22, wherein instructions for performing a re-integration handshake comprises instructions for:
connecting to the peer-to-peer IT backbone;
sending a broadcast through the OOB microcontroller to the immediate peers announcing the re-joining of the network; and
receiving, from the immediate peers, any data/information that was disseminated while the client computer was offline.

24. The article of claim 23, further comprising instructions for sharing any data with peers of the client computer, if necessary.

25. The article of claim 22, wherein if the client computer is not on-line, the article further comprising instructions for:
determining whether access to the reserved area of the storage device is being requested; and
if access is being requested, enabling the OOB microcontroller to proxy access to the reserved area, wherein the reserved area is treated as a P: drive equivalent.

26. The article of claim 25, wherein the P: drive equivalent is accessed while offline.

* * * * *